Patented Dec. 21, 1948

2,456,686

UNITED STATES PATENT OFFICE 2,456,686

PROCESS FOR OBTAINING VITAMIN K COMPOUNDS

Edward A. Doisy, Webster Groves, and Sidney A. Thayer, St. Louis, Mo., Donald W. MacCorquodale, Highland Park, Ill., Ralph W. McKee, Newton, Mass., and Stephen B. Binkley, Detroit, Mich., assignors to President & Board of Trustees of St. Louis University, St. Louis, Mo.

No Drawing. Application May 11, 1944,
Serial No. 535,204

6 Claims. (Cl. 260—396)

The invention relates to a method of obtaining compounds having antihemorrhagic or vitamin K activity, whereby intermediate compounds of greater stability than the vitamins from which they are derived are produced.

This application is a continuation-in-part of our applications, Serial No. 277,774, filed June 7, 1939, now Patent No. 2,737,105, dated April 10, 1945, and Serial No. 294,316, filed September 11, 1939, now Patent No. 2,348,037, dated May 2, 1944.

It is known that vitamin K products and concentrates are obtainable from various animal and vegetable materials, such as alfalfa, spinach, soybean oil, liver, putrified fish meal, etc. On the other hand, it is also known that the antihemorrhagic vitamins are labile substances which are subject to inactivation in greater or lesser amounts during the usual processes of extraction, adsorption, distillation, etc., used for isolating them.

The present invention overcomes, to a great extent, the objections mentioned in the processes heretofore used, by reacting the vitamin K in its relatively crude form with an esterifying or etherifying agent, either during or after reduction of quinone groups to hydroquinone groups, to obtain an ester or an ether of the reduced form of the vitamin, which, because it is more stable than the vitamin, is then subjected to the known methods of concentration and purification with practically no loss of activity. After the reduced and esterified, or etherified, derivative has been sufficiently concentrated, it can be converted back into a purified vitamin product by hydrolysis and oxidation. Instead of converting the derivative back into the vitamin from which it was obtained, the derivative can, in many instances, be directly used for therapeutic purposes, since it has been found that the derivatives often have high antihemorrhagic potency, in some cases having activity of the same order as the original vitamin itself.

The invention is not limited to the use of crude or impure vitamin K products as starting materials, since it is possible to start with a pure vitamin K, as obtained for example by isolation from a natural source or by synthesis, convert this by reduction and esterification or etherification into the ester or ether, and use the latter for its vitamin K effect. An advantage in such cases is that the ether or ester obtained has greater stability than the natural vitamin from which it was derived.

Vitamin K activity is exhibited by a number of different substances. However, apparently all of them have a quinone-like chemical structure, and are capable of reduction to hydroquinone-like compounds. The present invention can therefore be more fully understood by considering the esterification or etherification step of the present invention as a replacement of phenolic hydroxyl groups in the reduced or hydroquinone form of the vitamin by groups capable of hydrolysis to give hydroxyl, such as —O—acyl, —O—alkyl, —O—aryl, —O—aralkyl, —halide, —O—cycloalkyl, etc.

The invention can be illustrated by the following examples:

Example 1

The starting material for this example is vitamin $K_1$, a pure antihemorrhagic vitamin obtained by petroleum ether extraction of dried alfalfa meal and subsequent purification by adsorption on a zeolite, as described for example in J. A. C. S., 61, 1295. Such a product is hereinafter designated as vitamin $K_1$. It is 2-methyl-3-phytyl-1,4-naphthoquinone and has the following formula:

$$\text{naphthoquinone ring}-CH_3, -CH_2CH=C(CH_3)CH_2CH_2CH_2CH(CH_3)CH_2CH_2CH_2CH(CH_3)CH_2CH_2CH_2CH(CH_3)CH_3$$

Vitamin $K_1$ is an oil at ordinary temperatures, having a polyene structure which absorbs 4 moles of hydrogen upon catalytic reduction, exhibits ultraviolet absorption spectrum maxima (hexane solution) at 243, 248, 261, 270, and 323 m$\mu$ and has an antihemorrhagic potency of approximately 1 chick unit per 0.5 microgram.

100 milligrams of this vitamin $K_1$ are dissolved along with 100 mg. of fused sodium acetate in 10 cc. of acetic anhydride. The solution is then refluxed with 1 gram of zinc dust for 30 minutes. An additional 1 g. of zinc dust is added, a few milligrams at a time, during the period of heating. The mixture is filtered while hot. The acetic anhydride filtrate is decomposed by the addition of 20 to 30 cc. of water. After decomposition has taken place, the mixture is extracted with ether, the ether extract is washed with water and evaporated to dryness. The residue is then taken up in and recrystallized from absolute methyl alcohol at −5° C. The product can also be crystallized from low boiling petroleum ether (30–60° C.). It is very soluble in acetone, ethyl alcohol and benzene and can be recrystallized in the form of fine snow white needles from methyl alcohol or petroleum ether. It has a melting point of 59° C. and is diacetyl dihydro vitamin $K_1$. Analysis of the compound gives the following figures:

Carbon, 78.21% and 78.01%.
Hydrogen, 10.07% and 10.03%.
Oxygen, 11.72% and 11.96% (by difference).
Molecular weight, 531 (Rast).

Microhydrogenation of a sample of the diacetyl dihydro vitamin $K_1$ causes it to take up 3.04 moles of hydrogen ($H_2$). The vitamin $K_1$ itself took up 4.08 moles of hydrogen.

Bio assay by the chick method shows that the diacetyl dihydro vitamin $K_1$ has an activity of about 500 units per mg.

Absorption spectrum examination of the diacetate of this example shows a general absorption in the region from 220 m$\mu$ to beyond 300 m$\mu$ with intense absorption at 230 m$\mu$ where the extinction coefficient is $$E_1^{1\%}{}_{cm.} = 1300$$

The diacetate of this example is not readily hydrolyzed by alkali or acids in an aqueous or alcoholic medium. In alcoholic solution its activity is not destroyed by 100 hours exposure to the light from a 100 watt bulb at a distance of 4 feet. On the other hand, there is extensive destruction of the vitamin activity when vitamin $K_1$ itself is exposed under the same conditions and for the same length of time.

Pure diacetyl dihydro vitamin $K_1$ has a melting point of 62–63° C. and has the following name and formula:

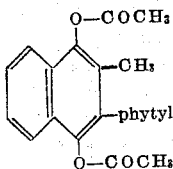

Diacetate of 2-methyl-3-phytyl-1, 4-naphthohydroquinone.

The diacetyl dihydro vitamin $K_1$ of this example is converted to vitamin $K_1$ by treating an anhydrous ether solution of the diacetyl dihydro compound with a 14 times excess of methyl magnesium iodide, adding water to hydrolyze to dihydro vitamin $K_1$, and shaking an ether solution of the latter with air to oxidize it to the corresponding quinone-like compound, vitamin $K_1$. After evaporating off the ether, the residue is fractionally distilled at $2\times10^{-4}$ mm. pressure. About 90% of the vitamin activity is obtained in the fraction distilling at 115–145° C. This fraction is practically pure vitamin $K_1$ and analyzes as follows:

Carbon, 82.34%.
Hydrogen, 10.13%.
Oxygen, 7.53% (by difference).

It has an antihemorrhagic activity in the chick test of 1,000 units per milligram.

That the vitamin $K_1$ produced by hydrolyzing the dihydro vitamin $K_1$ diacetate obtained in this example is identical with the pure vitamin $K_1$ started with is further proved by the fact that reductive acetylation can be repeated on it to give a diacetate of a dihydro vitamin having a melting point and giving results in a bio-assay identical with the original diacetate of dihydro vitamin $K_1$. The diacetate from the second reductive acetylation also does not give any lowering of the melting point in a mixed melting point test with the original diacetate of dihydro vitamin $K_1$.

*Example 2*

The starting material for this example is a petroleum ether extract of dried alfalfa leaf containing about 100 chick units of vitamin $K_1$ per milligram of solids. 250 mgs. of this concentrate are dissolved with 250 mgs. of fused sodium acetate in 25 cc. of acetic anhydride. The solution is then refluxed with 3 gms. of zinc dust for 30 minutes. An additional 2 gms. of zinc dust is added, a few milligrams at a time, during the period of heating. The mixture is filtered while hot, the acetic anhydride filtrate is decomposed by the addition of 80–90 cc. of water. After the anhydride has been decomposed, the mixture is extracted with ether, the ether extract washed and evaporated to dryness.

The residue is then taken up in 100 cc. of petroleum ether having a boiling point of 90–110° C. and passed through a column of adsorbent such as Permutit or charcoal. One can use adsorbents such as alumina, fuller's earth, calcium carbonate, etc., which are known to cause extensive destruction of vitamin activity when used with vitamin $K_1$ itself. Using a column of Permutit 35 mm. in diameter by 40 cm. long, the 100 cc. of petroleum ether solution of the crude diacetate of dihydro vitamin $K_1$ is poured onto the top of the column, followed successively by about 2 liters of petroleum ether, 1½ liters of petroleum ether containing 10% of benzene, 1 liter of petroleum ether containing 20% benzene, 1 liter of petroleum ether containing 50% benzene, 2 liters benzene and 1 liter alcohol, collecting 500 cc. fractions at the bottom of the column. The purified diacetate of dihydro vitamin $K_1$ is found chiefly in the benzene fractions while most of the inactive material is obtained in earlier fractions. The solvent is removed from the active fractions, and the residue is taken up in and crystallized at low temperature from absolute methyl alcohol. After recrystallizing a few times it melts at 59° C. and is identical with the diacetate of Example 1. By combining the least active fractions and passing them through the column again it is possible to obtain practically quantitative recovery of all the vitamin activity in the form of substantially pure diacetate of dihydro vitamin $K_1$.

*Example 3*

Material for this example is designated as vitamin $K_2$ and is a crystalline product melting at 52° C. and obtained by extracting putrified fish meal with an organic solvent and treating the extract with a zeolite adsorbent, as described in J. A. C. S., 61, 1295. Vitamin $K_2$ is a 2-methyl-3-alkyl-1, 4-naphthoquinone in which said 3 alkyl group has 30 carbon atoms and 6 double bonds. 200 mg. of vitamin $K_2$ is dissolved along with 200 mg. of fused sodium acetate in 22 cc. of acetic anhydride. The solution is refluxed with 2 gm. of zinc dust for 30 minutes, adding an additional gram of zinc dust, a few milligrams at a time, during the period of heating. The hot mixture is filtered and the acetic anhydride filtrate decomposed by adding 50 cc. of water. After the anhydride has reacted with the water, the mixture is extracted with ether, the ether extract washed with water and evaporated to dryness. The residue is taken up in and recrystallized from cold absolute methanol and the diacetate of dihydro vitamin K₂ separates as a white crystalline product melting at 57–58° C.

The diacetate gives the following analysis:

Carbon, 80.89% and 81.03%.
Hydrogen, 9.94% and 9.979%.
Oxygen, 9.17% and 8.99% (by difference).
Molecular weight, 628.

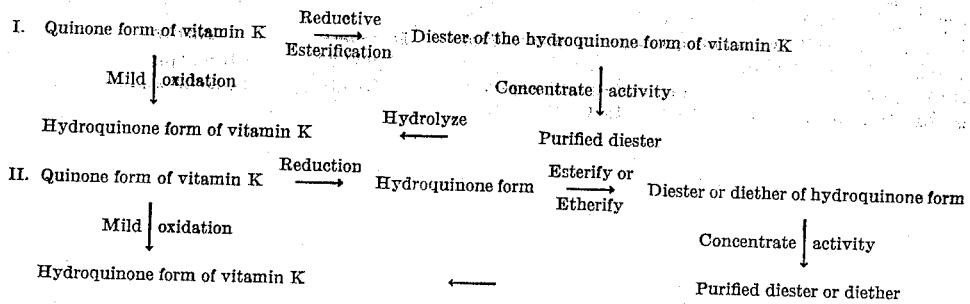

Upon microhydrogenation, the diacetate takes up 7.99 mols. of hydrogen. Vitamin K₂ itself takes up approximately 9 mols. of H₂. The diacetate of dihydro vitamin K₂ assays approximately 300 chick units per mg. Ultraviolet absorption is very similar to that of the diacetate of Example 1. It has an extinction coefficient of $$E_{1\,cm.}^{1\%} = 1280 \text{ at } 232\,m\mu$$

Example 4

This example is carried out as described under Example 2, but using as starting material a crude petroleum ether extract of putrified fish meal containing 120 chick units of vitamin K₂ active material per milligram of solids. After the solvent is evaporated off of this extract, the crude vitamin K₂ residue is converted to the crude dihydro diacetate by reductive acetylation and then purified by an adsorbent as described under Example 2.

The diacetate products of Example 2 and of Examples 3 and 4 can be hydrolized and oxidized to get back pure vitamin K₁ and vitamin K₂ respectively, in the same manner as described under Example 1. Instead of using sodium acetate and acetic anhydride, other alkali metal carboxylates and carboxylic acids can be used. For example, by using a propionic acid, benzonic acid, chloroacetic acid, or succinic acid anhydride, along with the corresponding alkali metal salt, one can obtain the dihydro vitamin propionates, chloroacetates, succinates, etc., such as 2-methyl-3-phytyl-1, 4-naphthohydroquinone dipropionate (dihydro vitamin K₁ dipropionate), 2-methyl-3-phytyl-1, 4 naphthohydroquinone dibenzoate and succinic acid esters of 2-methyl-3-phytyl-1, 4-naphthohydroquinone and the alkali metal salts thereof.

The examples show that vitamin K which has been converted to its phenolic form and esterfied or etherified is more stable than its original quinone-like form. It can thereafter be treated, in accordance with the present invention, by any of the known methods of concentration and purification, such as adsorption, fractional distillation, fractional crystallization, etc., with practically no loss of vitamin activity.

Although the examples show simultaneous reduction and esterification of the vitamin, the invention also embodies the variation wherein the quinone-like vitamin is first reduced and then esterified or etherified. The two variations of the process can be represented diagrammatically as follows:

I. Quinone form of vitamin K —Reductive Esterification→ Diester of the hydroquinone form of vitamin K Mild oxidation ↓      Concentrate activity ↓

Hydroquinone form of vitamin K ←Hydrolyze— Purified diester

II. Quinone form of vitamin K —Reduction→ Hydroquinone form —Esterify or Etherify→ Diester or diether of hydroquinone form Mild oxidation ↓     Concentrate activity ↓

Hydroquinone form of vitamin K ←— Purified diester or diether

Reduction to the hydroquinone form can be accomplished by any of the known methods for converting a quinone to a dihydric phenol. For example, catalytic reduction or hydrogenation may be used. Also, reduction with sulfur dioxide, sodium hydrosulfite, titanous chloride, stannous chloride, and the like can be used. The hydroquinone form of vitamin K₁ is 2-methyl-3-phytyl-1, 4-naphthohydroquinone, having the formula:

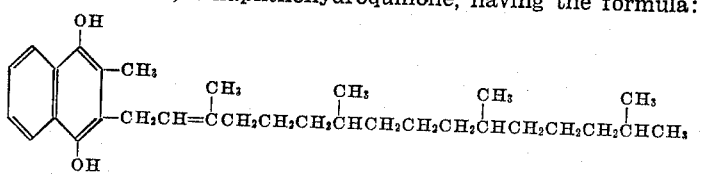

What we claim as our invention is:

1. Process for obtaining an antihemorrhagic compound comprising treating an extract containing a crude form of a compound of the class consisting of vitamins K₁ and K₂ with a reducing agent and an agent of the class consisting of esterifying and etherifying agents thereby obtaining a crude form of dihydro diester of said vitamin, treating said crude diester product by known methods to obtain a substantially pure diester and converting the latter by hydrolysis and mild oxidation into a substantially pure vitamin.

2. Process for obtaining a purified antihemorrhagic compound comprising reacting a crude form of a compound of the class consisting of vitamins K₁ and K₂ with a reducing agent to obtain the corresponding hydroquinone-like compound, reacting the latter compound with an agent of the class consisting of esterifying and etherifying agents to obtain a compound of the class consisting of the corresponding esterified and etherified dehydro derivatives of vitamins K₁ and K₂ and hydrolyzing and oxidizing said last mentioned compound to obtain the original compound in a purified state.

3. Process for obtaining an antihemorrhagic compound comprising treating an impure form of a quinone compound having antihemorrhagic activity with a reducing agent and an agent of the class consisting of esterifying and etherifying agents to obtain a compound of the class consisting of the corresponding esterified and etherified hydroquinone compounds and hydrolyzing and oxidizing said last mentioned compound to obtain the original quinone compound in a more purified state.

4. Dihydro vitamin $K_2$.

5. In a process for obtaining an antihemorrhagic compound, the step of mildly oxidizing a hydroquinone derivative of a 2-methyl-3-alkenyl-1,4-naphthoquinone compound having antihemorrhagic atcivity, at its 1 and 4 positions only, to obtain said naphthoquinone compound.

6. In a process for obtaining an antihemorrhagic compound, the steps of hydrolizing and mildly oxidizing a compound of the class consisting of esterified and etherified hydroquinone derivatives of a 2-methyl-3-alkenyl-1,-4-naphthoquinone compound having antihemorrhagic activity, at its 1 and 4 positions only, to obtain said naphthoquinone compound.

EDWARD A. DOISY.
SIDNEY A. THAYER.
DONALD W. MacCORQUODALE.
RALPH W. McKEE.
STEPHEN B. BINKLEY.

REFERENCES CITED

The following references are of record in the file of this patent:

UNITED STATES PATENTS

| Number | Name | Date |
| --- | --- | --- |
| 1,984,511 | Anderson | Dec. 18, 1934 |
| 2,348,037 | Thayer | May 2, 1944 |